April 20, 1937.  G. LANGFORD  2,078,082
METHOD OF MANUFACTURING RAIL JOINT BARS
Filed July 3, 1936  5 Sheets-Sheet 1
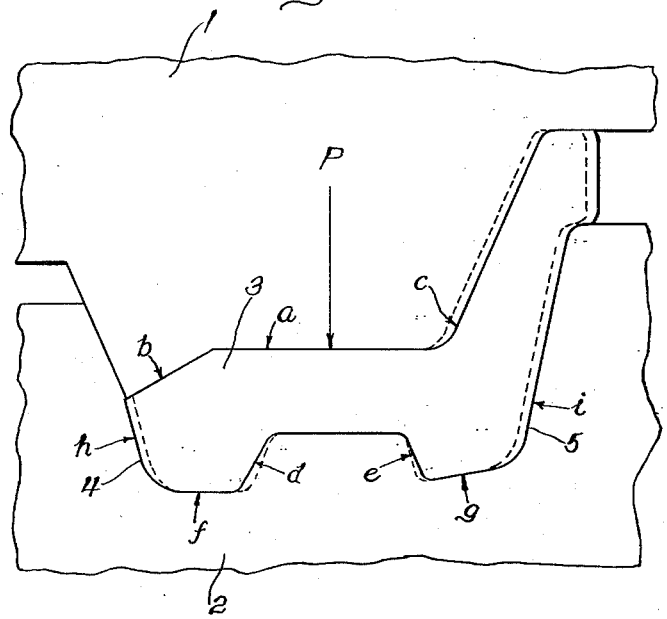
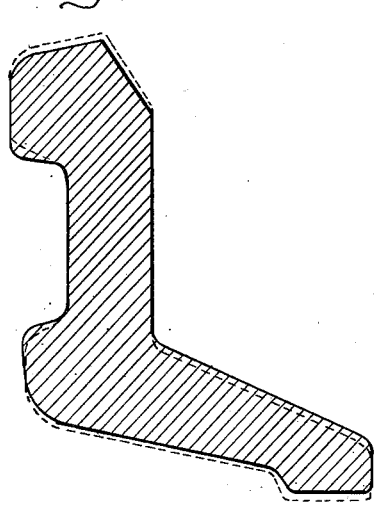 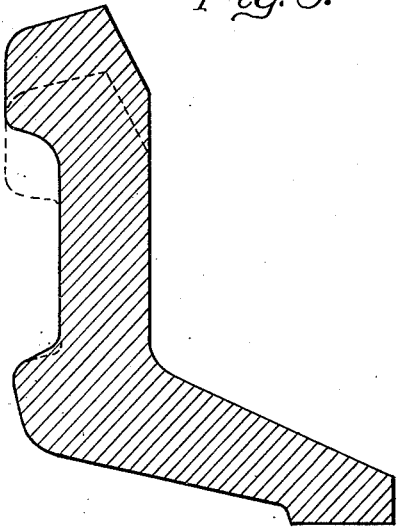
Inventor:
George Langford
By Brown, Jackson, Boettcher & Dienner
Attys April 20, 1937. G. LANGFORD 2,078,082

METHOD OF MANUFACTURING RAIL JOINT BARS

Filed July 3, 1936 5 Sheets—Sheet 2

Inventor:
George Langford
By Brown, Jackson, Boettcher & Dienner
Attys

April 20, 1937.　　　G. LANGFORD　　　2,078,082
METHOD OF MANUFACTURING RAIL JOINT BARS
Filed July 3, 1936　　　5 Sheets—Sheet 3
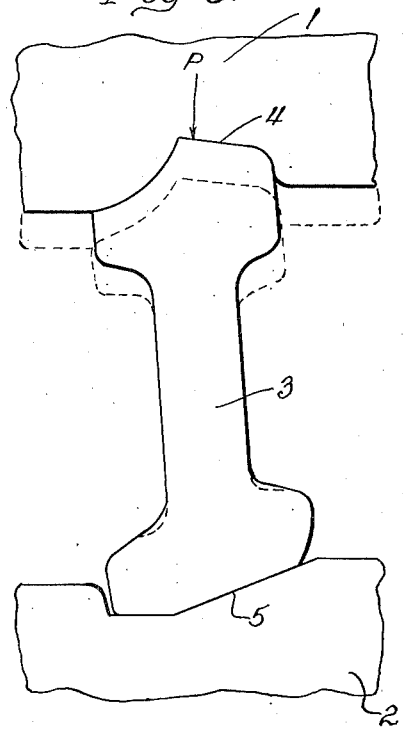
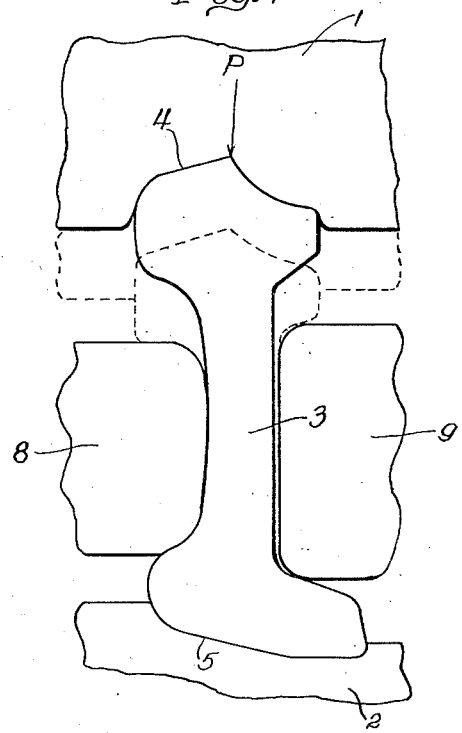
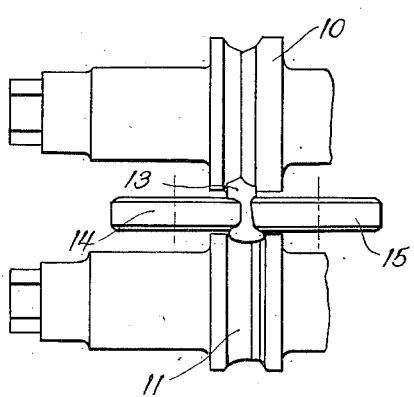
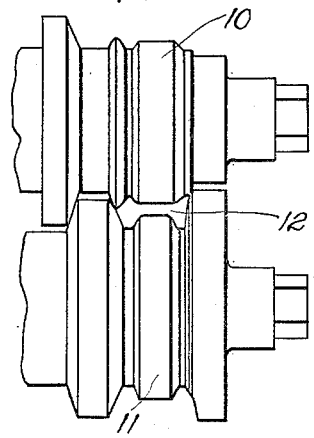
Inventor:
George Langford
By Crown, Jackson, Boettcher & Dienner
Attys

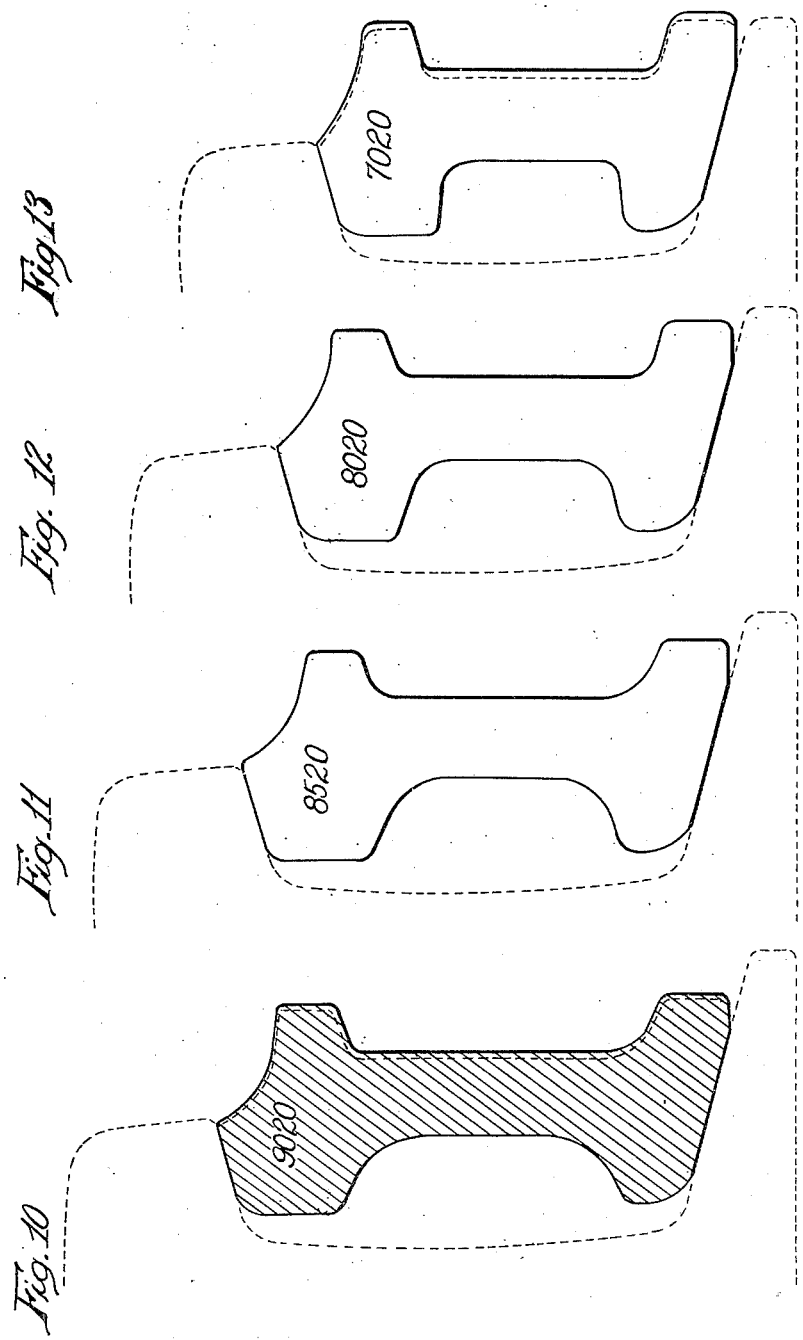

April 20, 1937.  G. LANGFORD  2,078,082
METHOD OF MANUFACTURING RAIL JOINT BARS
Filed July 3, 1936  5 Sheets-Sheet 5

Inventor:
George Langford
By Brown, Jackson, Critchlow & Dienny
Attys

Patented Apr. 20, 1937

2,078,082

UNITED STATES PATENT OFFICE 2,078,082

METHOD OF MANUFACTURING RAIL JOINT BARS

George Langford, Joliet, Ill.

Application July 3, 1936, Serial No. 88,914

12 Claims. (Cl. 80—65)

My invention relates to a method of manufacturing the bars used to connect rails together to make a railway track. More particularly it has to do with a novel step in the process of manufacture. Its chief purpose is to effect a standardization of rail joints, or at least a nearer approach to that end than now exists.

For many years back and until now, successive series of standard rails have been adapted by various engineering associations. One series of standards after another has been used and discarded for another series. There have been standards for railroads in general and standards for individual railroads, but there has not been and is no standard of rails for all railroads. The result is that our country's railway tracks contain many shapes of rails, and these rails must have many shapes of bars to fit them. There have been standards for rails, but bars have received very little consideration in this respect, and railway tracks contain a much greater variety of bars than they do of rails.

The subject, as pertaining to bars, has been discussed at length on pages 282–285 of the May 1935 issue of "Railway Engineering and Maintenance" in an article entitled "Rail joints: Can they be standardized?" The article shows clearly the reasons why standardization is desirable, and it also shows the great burden imposed upon the manufacturer by the apparent inability of railway engineers all to agree upon any one thing in respect to rail joints. Allowing for differences in speeds, train-loads and train-frequency which call for differences in size of rail and weight per yard, it would appear that one standard series of rails might suffice for all railroads. But there is no one standard series of rails for all railroads. There are many shapes, and the main difficulty is that there are many fishing heights. My invention is concerned chiefly with this last named fact. Many fishing heights of rails mean many fishing heights of bars. The main requirement of a bar is that it must be of a fishing height that will enable it to fit accurately to a rail of the same fishing height. The bar may be of any type or cross-sectional shape but it must fit the fishing height of the rail. If it does not, the bar is no good in a joint.

The method of my invention is intended to find a way to the standardization of rail joint bars from the manufacturing standpoint, for I believe that any successful attainment of this object must take the manufacturer into consideration. He is not only familiar with the performance of his product in track but he knows how to make it.

Any new design of bar generally means new sets of rolls and dies. The manufacturer may have his yard and storehouse filled with such equipment, which a new design of bar cannot make use of. It merely adds to the great burden of more or less idle equipment. Designs of rail joint bars are continually changing, and railway tracks are filled with many kinds. This is true of both rails and bars, but the bars usually need replacement more often than the rails. New bars are needed to fit obsolete standards of rails. Such bar requirements may involve only small tonnage at any one time, but the manufacturer must resurrect the ancient rolls needed to fill such orders and disarrange his rolling schedule to satisfy his customer as to price and promptness of delivery. This is not easy to do.

However, the manufacturer has rolls for modern sections of bars, and he would be only too glad to use these rolls to fill short orders for ancient sections, if this could be managed in some way. If bars made in modern rolls could be made to fit ancient rail sections, it would be a big help. They need not be rolled to a final fit provided they could be so finished in some manner other than by rolling and thereby relieve the manufacturer of his main difficulty; disarrangement of his rolling schedule. Assuming that a bar section selected by him was convertible by some method other than by rolling, into many bar sections of various fishing heights, to fit various rail sections ancient and modern, the most of his troubles would be over. At convenient periods, he would roll bars of master section and stock them in long lengths in the bar finishing mill where short orders for bars to fit ancient rails could be filled promptly from the master bar section stock by conversion. Rolling bars requires planning and preparations. Finishing bars already rolled requires very little planning and can be done very promptly.

The method of my invention is one of conversion and can be accomplished in the bar finishing mill from a rolled bar of master section. It is intended to relieve the manufacturer of his immense burden of unnecessary rolling equipment; of frequent roll changes; disarrangement of his rolling schedule; and other difficulties, all of which prevent low prices and prompt deliveries, as far as short orders are concerned.

In my future discussion of bar and rail sections, I will refer to them by their well-known section members. A rail and the bar to fit it, will use the same section number. An obsolete standard of bar or rail refers to a rail or series of rails, also called ancient rails. The A. S. C. E. series once a standard was replaced by a more modern standard A. R. A. series, and there is now a still more modern standard A. R. E. A. series. In addition, individual railroads have adopted their own standards; and they too have ancient standards replaced by new ones.

The manufacturer would prefer of course to confine his rolling to the more modern bar sections, but he is compelled by the necessity for track replacements, to roll ancient bar sections also, the latter being usually small and less profitable orders. To simplify this rolling confusion, I select one or more bar sections convenient for the manufacturer and use them as master sections, their main distinction being that they are of fishing height suitable for use on modern standard rails. In other words, a master section of bar is one suitable to the manufacturer and therefore his choice for conversion into other less commonly used sections for ancient rails. My invention is a step in manufacture whereby a rolled steel bar of master section is converted into bars of various lesser fishing heights for use on various sizes of rails ancient and modern. This conversion is its main object. Another object is a rolling standardization, whereby a few rolled master sections are sufficient to produce by conversion all sizes of bars needed for all sizes of rail, standard or obsolete. My method of conversion will be understood from the following description and accompanying drawings, in which:

Fig. 1 is an end view of a bar being reformed in dies by a method of the prior art;

Fig. 2 is a section, showing the range of fishing height conversion of a bar by the method of Fig. 1;

Fig. 3 is a section, showing the range of fishing height conversion of a bar by the method of my invention;

Figs. 6 and 7 represent variations of the method of Fig. 4;

Figs. 8 and 9 show the method of my invention adapted to the rolling of bars;

Figure 16:
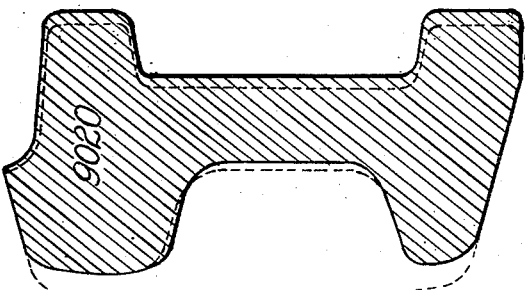
Figure 15:
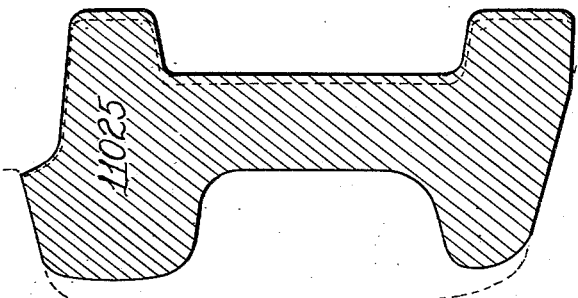
Figure 14:
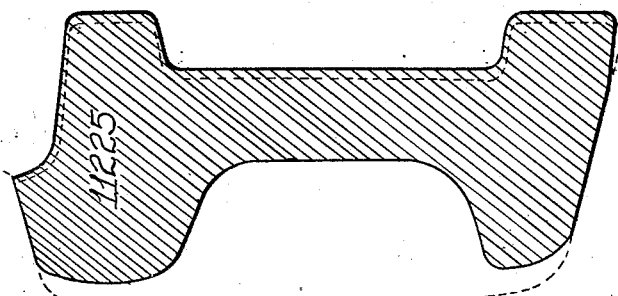

Figs. 10 to 13, inclusive, illustrate a series of bars in end view showing the results of conversion of bars of various fishing heights from a master bar section of greater fishing height; and Figs. 14 to 16, inclusive, illustrate a series of bars in transverse sectional view showing various results of conversion of bars in rolls and in dies.

In one of the simplest variations of my method, a master bar used for conversion is rolled to a long length and then allowed to cool, after which it is sheared into required short lengths, and the short bars are heated again in a furnace. These are steps of ordinary manufacture. The next step is the one which I claim as new. It may be compared with old procedure, which latter I will now describe for purpose of comparison. The prior art is shown in Fig. 1. This is a fragmentary end view of a moving top die 1 and a fixed bottom die 2 closed upon a finished bar 3, the original bar being shown in dotted lines, and the converted bar in full lines.

The conversion of the master bar section into another section is largely a conversion of one fishing height into another fishing height. In the prior art, a bar is converted in the position shown. It may be inverted or be more inclined to the direction of pressure P but the application of pressure upon the top fishing surface 4 and the bottom fishing surface 5 is always indirect. Direct pressure occurs on the outer face of the bar as per the small top arrows "a", "b" and "c", and the reactions are carried on the bottom die as per the small bottom arrows d, e, f and g, the final reactions being upon the top 4 and bottom 5 fishing surfaces as indicated by the small side arrows h and i.

The method of Fig. 1 by indirect pressure is best adapted for raising the fishing height of a bar rather than lowering it. Under pressure and reactions, the top and bottom fishing surfaces 4 and 5 are finally forced to the corresponding die walls. Lowering the fishing height is very destructive to the die walls 4 and 5 and prevents their being long maintained to the necessary accuracy. This destructive effect increases as the reduction in fishing height is increased. A mere $\frac{1}{16}$ inch reduction is destructive, and so this indirect method is confined mostly to raising the fishing height, but it is so difficult to raise the fishing height in such an indirect manner that a rise of $\frac{1}{16}$ of an inch is extremely uncertain and is best restrained to about $\frac{1}{8}$ of an inch to secure good results.

Fig. 2 shows the range of conversion by the method of Fig. 1. The master bar section is in cross-section, the converted bar being shown by dotted lines. The converted bar has its fishing height raised about $\frac{1}{8}$th of an inch. This is a very limited range, too limited to serve for more than a few bars to fit old rail sections. It has the further disadvantage that the conversion from a master section must begin with a comparatively small bar and work upward.

Fig. 3 illustrates a more desirable procedure and one of greater range of conversion than that of Fig. 2. It is the method which I claim as new. The master bar is shown in section, and the low range of section conversion is shown in dotted lines. The conversion of the master bar after shearing to short lengths, is downward not upward; and the range of conversion is many times greater than the range of Fig. 2.

Ancient rail sections are all sizes from 70 to 100 pounds per yard, and most of them are included in a range of from 2½ to 3⅛ inches in total fishing height. All sections of rails now used are known by numbers, the last two numbers denoting the particular standard, and the first two or three numbers, the rail's weight per yard. For example:

7020 = rail 70 lbs. per yard; A. R. A.-A. standard (20)

7040 = rail 70 lbs. per yard; old A. S. C. E. standard (40)

10030 = rail 100 lbs. per yard; A. R. A.-B. standard (30)

There are other standards including various weights per yard.

In selecting a master section of bar, a moderately heavy section is preferable to a light section. For example, it is better to work downward from 8520 to 7020 than upward from 7020 to 8520. A bar for 85 lb. A. R. A.-A. rail may have more metal than necessary for a 70 lb. A. R. A.-A. rail but the latter has decidedly insufficient metal for the 85 lb. rail. A heavier bar is also more desirable than a lighter bar from the mill viewpoint, as it is more liable to be in demand. Railroads buy heavier rails than they used to, and not many are now ordered for heavy duty tracks weighing less than 85 pounds per yard.

For convenience of illustration I will first select 8520 as a master bar section. Taking a list of rail sections made by one large steel company and now in use, I find that I can convert an 8520 bar used as a master section, into bars suitable for use on about 30 different rail sections ranging from 101 to 70 lbs. per yard. In this selection, the range in fishing height is from 3 to 2½ inches. My method of conversion permits of a greater range but this is restricted by the amount of metal in the bar. There must be enough metal in the highest bar but this may be too much in the lowest, and so I start with a workable range of ½ inch variation in fishing height, beginning with 8520 and working down to 7020 as in Fig. 3, the range from high to low comprising bars suitable for use on about 30 different rail sections of not merely various fishing heights but also of various fishing angles. One bar of rolled master section will make them all. One rolling takes the place of 30 rollings when using the method of conversion which I claim as new.

Figure 4:
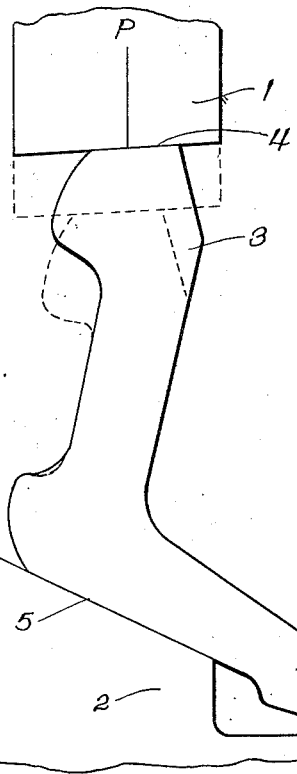
Fig. 4 is an end view of a bar being converted into a bar of reduced fishing height by the method of my invention.

This method in its simplest form is shown in Fig. 4 which is an end view of a master bar 3 with its bottom fishing surface 5 resting on a fixed die 2, and its top fishing surface 4 being subjected to pressure in a direction P by a descending die 1. The latter descends to the dotted line position, compressing the bar as shown in dotted lines to any desired fishing height within the range of conversion. This is a simple and effective method which may be elaborated upon by a second operation as in Fig. 5. This latter is somewhat similar to the method of Fig. 1. In Fig. 4 the web of the bar may be bent or the fishing surfaces may not be quite true. It may be found desirable to shorten the inner or outer part of the bottom member. Some of these alterations may appear in Fig. 5. The dotted lines show the bar worked upon, and the finished bar is shown in full lines.

Fig. 6 is a variation of the method of Fig. 4. The master bar section shown in full lines, is of unsymmetrical I-beam cross-section, and is known as a "toeless bar" because its bottom member has no toe or long outwardly extended part as in the angle form of bar commonly used. The lateral reinforcements of its top and bottom members simplify the application of vertical pressure P to compress it to a bar of desired fishing height, shown in dotted lines.

Figure 5:
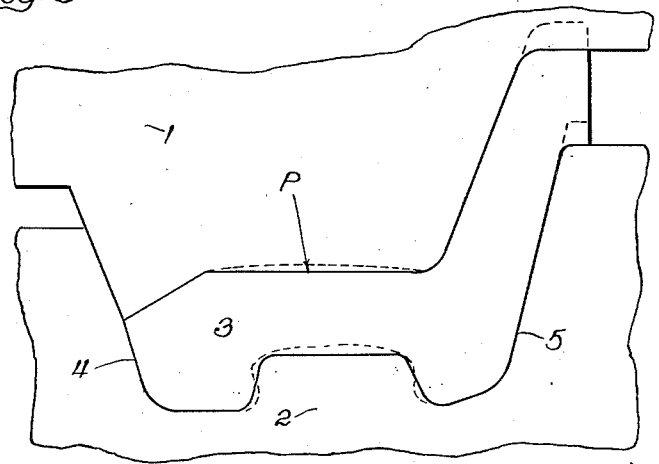
Fig. 5 is an end view of a bar receiving some supplementary reshaping after the conversion of Fig. 4.

Broadly I claim as new a method of applying pressure upon the top and bottom fishing surfaces, directly as in Figs. 4 and 6 instead of indirectly as in Figs. 1 and 5, and I convert a bar of one fishing height to a bar of another fishing height not by raising it as in Fig. 1 but by lowering it as in Figs. 5 and 6. The latter has many advantages, some of which I will now explain.

First, this is a very effective method of reducing the fishing height of a bar, and a maximum reduction may be secured with a minimum of power expenditure. Pressure, so directly applied upon the fishing surfaces, results in a fine smooth finish on those surfaces. There are other advantages, but the most valuable one is that it permits the rolling of bars of many fishing heights in a few sets of rolls instead of in the many sets of rolls necessitated by present practice. The manufacturer has a separate set of rolls for each fishing height of bar; also separate rolls for every cross-sectional shape of bar even though its fishing height be the same as that of another shape. Shapes vary, and fishing heights vary, multiplying endlessly the sets of rolls required. And yet the railroad user's first requirement is a bar of a certain fishing height. His next considerations are price and promptness of delivery. The cross-sectional shape of the bar is the least of his worries, provided it fits his rails. A fair price and prompt delivery are his main concern, and these requirements are very difficult for the manufacturer to meet, due to the multiplicity of rolls and frequent roll changes. Each customer must await his turn. It is difficult for the manufacturer to serve two or more customers at once in any one rolling, for the reason that as a rule they use different bars; different in fishing height, in length, in shape and in bolt spacing.

In this great variation and absence of standardization, the manufacturer is handicapped by the fact that any change in a bar's most important feature, its fishing height, necessitates a new set of rolls.

If the rolling of various fishing heights could be simplified, the manufacture of rail joint bars would be greatly simplified. If, as I have stated, a master bar section requiring only one set of rolls, is sufficient to produce bars of more than 30 fishing heights ordinarily requiring 30 sets of rolls, that would be a marked advance. It can be done by the method I claim.

In Fig. 6, a moderate reduction of the bar's fishing height will not cause much deformation of the web and the bolt holes may then be punched accurately, after which any imperfections in the bar's section or straightness may be removed in the final straightening operation. The latter is ordinarily done in dies while the bar is still hot, much as in the method of Fig. 1 and more particularly as in Fig. 5, which latter shows a considerable final truing up of various imperfections. In Fig. 6, there may be some distortion of the web of the finished section, and the fishing height and angles may not be made to exactness. But the final straightening operation will rectify such errors, as in Fig. 5, for the dies of Fig. 5 are accurately made to insure correct fishing height and angles, and straightness within the small range of tolerance permissible.

In Fig. 7, the master bar section is reduced much more in fishing height than it is in Fig. 6. This represents 9020 bar reduced more than ⅝th inch to the height of a 7020 bar. There may be some distortion of the web member, necessitating supporting means 8 and 9. There may be other imperfections, in which case the straightening operation of Fig. 5 has more work to do, so that it becomes in part a reforming operation and a very advantageous one where great reduction of height is desired as shown in Fig. 7.

The method of Figs. 4, 6 and 7 bears some resemblance to the method of my Patent No. 1,935,473, issued November 14, 1933. Figs. 5 and 6 of said patent are comparable with Figs. 4 and 5 of the present invention.

In Fig. 5 of said patent, the bar is subjected to pressure between two dies while in a more or less vertical position. This is also true of Fig. 4 in the present case, but there the similarity ends.

The disclosure of Fig. 5 of my patent is a change of shape not involving compression of the bar web or reduction of fishing height; and the converted bar shows no application of pressure upon its narrowed bottom fishing surface.

In the present Fig. 4, pressure is directed upon the top and bottom fishing surfaces for the sole purpose of substantially reducing the fishing height and compressing the web vertically. Both the method and result are different from those of Fig. 5 of said patent.

The discussion of my method has thus far concerned itself with dies but it need not be confined to them alone. It may also be applied to rolls in a rolling mill. It is always the wish of manufacturers and users both, that any desired shape of bar be adapted to the rolling of it to its final shape. My method permits this.

In Fig. 8, 10 is a top roll positioned over a bottom roll 11 so as to roll a master bar section 12, the latter being shown in the flat or near flat position in which it is ordinarily rolled. Assuming that a converted section of reduced fishing height is required, bar 12 of Fig. 8 when rolled may then be run through another "pass" placed vertically in the same or another pair of rolls as in Fig. 9, becoming a bar 13 of much reduced height requiring only the final straightening and truing up operation of Fig. 5. When cut to short lengths and reheated, the bar then would not require a die operation to reduce its height as in Fig. 6. In Fig. 9, distortion of the bar web could be avoided as in Fig. 6 by web supports 14 and 15 which are shown in Fig. 9 as vertical guide rollers. In the conversion of a master bar section to bar 13 of Fig. 9 by vertical rolling, some of the bars 12 of Fig. 8, 9020 for example, may be used to fill 9020 bar orders; some may be rolled to bar 13 of Fig. 9; and some may be stocked for later conversion to other bar sections by the method of Fig. 6 or 7. Also bars 12 of Fig. 8 may be finished or stocked for conversion. Instead of one vertical rolling to bar 13 in Fig. 9, there may be other vertical rollings to other heights of bars. As a method it offers a wide range to the manufacturer. His problem of rolls, roll changes and the multitudinous rollings is greatly simplified. Naturally such a relief from his troubles would soon lead the manufacturer to the matter of cross-sectional design adapted to the new method and acceptable to his railroad customers. His incentive to this is that he would no longer be compelled to roll all bars of varying fishing height in different sets of rolls. They could be made in a comparatively few rolls, but to accomplish this result the manufacturer must place some restriction upon the myriads of existing cross-sectional shapes. There is of course no necessity for such variation and complexity, nevertheless they exist and will continue to exist unless some good reason is presented for a change. Attempts at standardization have not proved successful for the reason that no convincing reason has been presented, other than the wisdom of standardization. It is difficult for the many users of bars to agree upon the design. But a plan to improve price and promptness of delivery would have a very stimulating effect.

Rails and bars may not yet be reduced to a few standards, but such a standardizing of manufacture as is made possible by my methods would be a great advance to that end. I have therefore made a series of manufacturing standards to better illustrate my point. These are shown in Figs. 10 to 13, inclusive.

For purposes of illustration, a 9020 bar is taken as the master section, shown in cross-section in Fig. 10. It may be converted by my method into 8520, Fig. 11, 8020, Fig. 12, and 7020, Fig. 13; and also many other bars of intermediate fishing heights not shown.

The bars of such a series, converted from one master section in dies must be very similar to each other in cross-sectional shape, the change from one bar to another being mostly in the compression of the web member. No metal is lost, and so the 7020 bar, Fig. 13, would weigh as much per foot as the 9020 master bar of Fig. 10. This could be a drawback although not necessarily a seriously objectionable one. Ordinarily bars are 24 inches long. The 7020 bar of Fig. 13 need not be over 22 inches long, and if the bolt-hole spacing would permit, a length of 20 inches would be sufficient.

In the case of bars converted by vertical rolling as in Fig. 9, the weight per foot would be reduced, for the reason that rolling results in elongation, reducing the weight per foot. The bars of Figs. 10 to 13, inclusive are intended as ones converted in dies from a master section 9020 shown in cross-section. I have selected a series of "toeless" type because this appears to be the most efficient type, much more so than the angle form of bar. It is meant only as a suggestion. The series might be of any type or cross-sectional shape but the series shown is a good one for my purpose. The method of my invention is intended to relieve the manufacturer, and yet it is based on the customer's chief demands; a precise fishing height to fit a certain section of rail, a reasonable price, and prompt delivery. Shapes chosen by the manufacturer may not be just what the customer might evolve if left entirely to his own devices, but that does not detract from their merits, although any sectional shape may be used as a master section and there may be more than one convertible series using various master sections to satisfy varieties of opinion. But the main point is that my method of conversion would not only better suit the needs of both the manufacturer and customer but would tend to bring them together on the question of standardization. The customer is not much concerned with the manufacturer's troubles, but he would be if he could thereby secure better prices and prompter delivery for himself.

The method of conversion which I claim has a wide scope. Its principal novelty is the conversion of a bar of one fishing height to a bar of substantially reduced fishing height, by pressure applied directly upon the fishing surfaces instead of indirectly. This conversion may be supplemented by another pressure operation commonly used in the prior art so as to correct any irregularities in the bar resulting from the first operation. In the first operation, the bar is in a more or less vertical position, the top and bottom fishing impinging surfaces being in separate rolls or dies. Bars may be so reduced in fishing height, either in rolls or in dies. When rolling, it has been the custom to roll a bar in a more or less flat position as in 12 of Fig. 8, the important feature being that the top and bottom fishing surfaces are finished in one roll. One or more of the early roll passes may turn the bar up into a more or less vertical position to reduce its height, but this is common practice for various rolled shapes when the bar is still a billet and before it attains a finished form. In my method, a bar may be finished as in 12 of Fig. 8; finished for use or for further conversion by rolling it vertically or near vertically as in 13 of Fig. 9. The converted bar 13 may then be rolled in a flat position to correct any irregularities. It may be cut up into short lengths for use or it may be converted into another bar. In any and all cases of die pressing or rolling a finished or near finished bar of one fishing height is converted into a bar of substantially reduced fishing height by pressure directly applied upon its top and bottom fishing surfaces. As fishing height in a bar allows only a few thousandths of an inch tolerance, I provide a final die or roll operation to insure precision. In ordinary bar manufacture this final operation is very similar to the final straightening operation before the bar is quenched in oil. As has been stated, this final operation may also be employed after the bar has been rolled vertically as at 13 in Fig. 9. It may then be rolled flat in a final pass to correct any errors, or it may omit this last pass and have any errors finally corrected in dies after the rolled bar is cut up into short usable bars for re-heating, punching, straightening and quenching, these being the ordinary steps of manufacture before the bar is ready for use in track.

As far as I am aware rail joint bars have never heretofore been rolled to substantially reduced fishing height in a vertical or near vertical position, in a finishing roll pass or in the pass preceding it, nor do I know of any such vertical rolling used as a final fishing height reducing operation. More specifically it is a converting method whereby a bar rolled to final usable section may be converted into many bars of different fishing heights. The pass of bar 13 in Fig. 9 may be in a pair of rolls other than the pass of bar 12, Fig. 8, and a final pass may be given the bar 13 of Fig. 9, so that the bar is ready for use as far as its cross-sectional shape is concerned. The vertical pass 13 of Fig. 9 is a very flexible one, in that it may serve for various desired fishing heights. It is a simple matter to line the two rolls farther apart or closer together, thereby making bars of various fishing heights in one pass of rolls. To a more limited extent, the rolls of pass 12 may be lined farther apart or closer together. If, for example, an accurately finished 9020 bar is to be produced, the rolls of Fig. 8 are set accurately to roll bar 12 into section 9020. But if the bar 12 of Fig. 8 is to be converted to, say an 8020 bar, then the rolls of pass 12 may be set closer together thereby making a lighter section as shown by the dotted lines of 9020 in Fig. 10. In this manner, the smaller 8020 and 7020 bars of Figs. 12 and 13, respectively, could be lightened of any surplus metal as shown by the dotted lines on 7020.

All the operations that I have figured and described, come within the range of ordinary mill procedure. A steel billet is heated and rolled in successive passes to a long length and a master bar section as 12 in Fig. 8. The bar may then be sent to the finishing mill for conversion in dies to a bar of reduced fishing height or it may be so converted by a vertical rolling pass as shown in bar 13 of Fig. 9. Bar 13 may then be sent to the bar finishing mill for final finish in dies; or it may be finished in a roll pass.

In any case, when the rolling is completed, the long bar is sent to the bar finishing mill where it is cut up into short lengths and reheated in a furnace. It then follows at least the ordinary procedure of hot-punching, hot-straightening and hot quenching.

If the long bar 12 of Fig. 8 has not been rolled to the reduced fishing height of bar 13 Fig. 9, the short bar is then reduced in height in dies as in Fig. 6 or 7, after which it is finished and straightened in dies. If desired, this straightening operation may provide substantial pressure for the purpose of sectional re-shaping; or means for such an operation may be held in reserve to be used when necessary, particularly in cases where a great conversion of fishing height is desired, as for example, a reduction from a 9020 of Fig. 10, to a 7020 bar of Fig. 13.

In Figs. 14 to 16, inclusive, I show a conversion series of three bar sections, many bars of intermediate fishing heights not being shown. The 11225 bar of Fig. 14 is one of the newest A. R. E. A. standards. The rail is a new standard, and as far as I know, this A. R. E. A. 11225 bar is the first to be offered as a standard for all of our country's railroads. It is a good design, and so in Fig. 14 I adopt it as a master section. Some railroads are using it; many are not. However it is popular enough for a start. The manufacturer after rolling an order of 11225 bars, may line the finishing rolls together to produce a lighter bar as represented by the dotted lines, and this lighter bar may then be rolled vertically as in 13 of Fig. 9 to section 11025 in dotted lines Fig. 14. This is a light section. The heavy section 11025 in full lines is the result of section 11225 full lines produced in dies. Section 9020 in full lines, Fig. 16, is the result of conversion from 11225 full lines, Fig. 14. Section 9020 dotted lines, Fig. 16, is a section produced from 11225 dotted lines, Fig. 14, by first rolling down the height vertically and then rolling the converted bar flat in a final pass. The bars of Figs. 10 to 16, inclusive, are not intended as accurate drawings but merely to illustrate the possibilities of conversion by my method, using rolls or dies or both.

Some of the novel and useful features resulting from my method are: a rolling standardization of rolls and bar sections whereby one set of rolls will serve the purpose of many sets of rolls in producing a master bar section from which bars of various fishing heights may be converted when needed, a method whereby a master bar section may be reduced to bars of various fishing heights by the direct application of pressure upon the top and bottom fishing surfaces preferably when the bar is in a more or less vertical position; and finally a series of bar sections of decreasing fishing heights convertible from a master section, all the bars of the series being of similar type and somewhat similar in section to each other. It is thought that my method is sufficiently new and useful to both the manufacturer and consumer to encourage a more unified effort toward the elimination of many unnecessary bar sections and the establishment of a few standards, thereby avoiding indiscriminate designing, waste, delays and unnecessary costs. Although conversion by rolling as described, may in some cases be very advantageous, it is thought that a greater advantage lies in the rolling of a master bar section in long lengths for later conversion in dies. The main difficulty in filling small or odd orders promptly, is to find time in the rolling mill schedule, much more so than finding time in the bar finishing mill schedule. When convenient, the rolling mill may roll a stock of long bars of master section for later conversion in the bar finishing mill, and the greatest difficulty in filling short orders promptly is then removed.

Obviously if the converting and finishing steps are accomplished by rolling, the finished bar section will be somewhat different from one in which these two steps are performed in dies. Rolling lengthens a bar, but the die-work does not. These facts may be taken into consideration in the filling of various orders and may be used in the determination of cross-sectional shapes of converted bars. These shapes may be of any kind which the customer desires, and are not limited to any one of the many types now in use.

Summarized briefly, my invention is a method whereby bars of various fishing heights may be made from a master bar of one fishing height by reducing the height of bars of master section to the various heights desired, thereby greatly reducing the number of rolls and rollings now required to produce bars of various fishing heights. This may be accomplished in the rolling or only partly accomplished in the rolling, further conversion of height being left to the bar finishing mill in dies. Instead of many rolls and many rollings as now practised, a comparatively few rolls and rollings will be sufficient to roll bars of master section, which may later be converted to the heights desired and when required, in the bar finishing mill, without any further disarrangement of rolling schedules. Although conversion in dies alone, gives little or no control of varying weight that might be desired in bars of varying height, this feature is very controllable in the rolling, and the latter may be used in conjunction with die-finishing to produce not only bars of various heights but of various weights per foot. My real purpose resulting from all this is eventually to attain some measure of bar standardization which under present conditions seems unattainable, due to the inability of the makers and users to find a working basis advantageous to both and within the province of good engineering.

What I claim is:

1. The method of converting rail joint bars of one fishing height into bars of lesser fishing height while hot, consisting in subjecting said bars of one fishing height to pressure applied directly upon their top and bottom fishing surfaces so as to effect a predetermined and substantial reduction of their fishing height, and then subjecting said fishing surfaces indirectly to pressure so that they will conform accurately in height and angles to rails of lesser fishing than that of the original bars.

2. The method of manufacturing rail joint bars of various fishing heights from bars of one fishing height while hot, which comprises subjecting said bars of one fishing height to pressure applied directly upon their top and bottom fishing surfaces so as to effect substantial predetermined reductions of the original fishing height, and then subjecting said fishing surfaces indirectly to pressure so as to make them conform accurately in heights and angles to rails of various fishing heights respectively and of lesser fishing heights than that of the original bars.

3. In the manufacture of new rail joint bars, the method of converting a rolled bar of one fishing height to a bar of reduced fishing height, consisting in subjecting the original bar while hot to pressure applied directly upon its top and bottom fishing surfaces so as to effect a substantial predetermined reduction of the original fishing height, and then subjecting the bar to pressure applied indirectly upon said fishing surfaces so that they will fit accurately to a rail of substantially less fishing height than that of the original bar.

4. The method of converting rail joint bars of one fishing height into bars of lesser fishing height, consisting in rolling bars of said one fishing height into long lengths and then subjecting them while hot to pressure applied directly upon their top and bottom fishing surfaces so as to effect a substantial predetermined reduction of their fishing height, the long bars then being cooled and cut up into short lengths, and said short lengths being reheated and subjected to pressure applied indirectly upon their top and bottom fishing surfaces to insure accuracy in the height and angles of said surfaces.

5. As a step in the manufacture of rail joint bars, the method of converting bars of one fishing height to bars of lesser fishing heights, consisting in subjecting the original bars while hot to deforming pressure, said pressure being applied directly upon the top and bottom fishing surfaces so as to effect substantial predetermined reductions of the original fishing height.

6. The method of manufacturing rail joint bars, consisting in rolling a bar while hot to long length, cooling said long length, and cutting it into short lengths, said short lengths then being reheated and subjected to pressure applied directly upon their top and bottom fishing surfaces so as to effect a substantial predetermined reduction of the fishing height of the original long bar, the short bars being then subjected to pressure applied indirectly upon their top and bottom fishing surfaces so that said surfaces will fit accurately to rails of less fishing height than that of the original long bar.

7. The method of manufacturing rail joint bars whereby bars rolled to fit a rail of one fishing height are converted while hot to fit rails of various lesser fishing heights, which comprises subjecting the original bars to pressure applied directly upon their top and bottom fishing surfaces so as to effect a substantial predetermined reduction of the original fishing height, and then subjecting the bars of reduced fishing height to pressure applied indirectly upon their top and bottom fishing surfaces so that the converted bars will fit accurately to rails of lesser fishing height than that of the rail for which the original bar was rolled.

8. The method of manufacturing rail joint bars, which comprises rolling bars originally of a given fishing height, and reducing the fishing height thereof and converting the original bars into bars of a lesser fishing height than said given fishing height and adapted to fit rail of said lesser fishing height.

9. The method of manufacturing rail joint bars, which comprises rolling bars originally of a given fishing height, and reducing the fishing height thereof while retaining substantially all of the metal of the original bars and converting the original bars into bars of a lesser fishing height than said given fishing height and adapted to fit rail of said lesser fishing height.

10. The method of manufacturing rail joint bars, which comprises rolling bars originally of a given fishing height, and reducing the fishing height thereof by rolling and converting the original bars into bars of a lesser fishing height than said given fishing height and adapted to fit rail of said lesser fishing height.

11. The method of producing a series of rail joint bars of successively decreasing fishing height and reduced weight, and of substantially similar cross sectional shape and having substantially similar proportions of metal in their respective head, web and foot members, which comprises rolling to long lengths bars of one fishing height to fit a given rail section, then rolling some of said long lengths to long lengths of smaller section of reduced weight and of reduced fishing height to fit rail of less fishing height than that of said given rail section, long bars of said one fishing height, and long bars of said reduced fishing height than each being cut into short lengths and the latter being finished for use on their respective rails of successively decreasing fishing heights.

12. The method of producing a series of rail joint bars of successively decreasing fishing height and of approximately the same weight and cross-sectional shape, and each having approximately the same amount of metal in each of their respective head, web and foot members, which comprises rolling to long lengths bars of one fishing height to fit a given rail section, then cutting said long lengths to usable short lengths and subjecting said short lengths to deforming pressure so as to reduce their fishing height and make them suitable for use on rail of less fishing height than the fishing height of said given rail.

GEORGE LANGFORD.